United States Patent
Lim (10) Patent No.: US 7,973,892 B2
(45) Date of Patent: Jul. 5, 2011

(54) LIQUID CRYSTAL DISPLAY DEVICE

(75) Inventor: Jae-Ik Lim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 173 days.

(21) Appl. No.: 12/209,072

(22) Filed: Sep. 11, 2008

(65) Prior Publication Data

US 2009/0141217 A1   Jun. 4, 2009

(30) Foreign Application Priority Data

Nov. 30, 2007   (KR) .................. 10-2007-0123844

(51) Int. Cl.
*G02F 1/1335* (2006.01)
(52) U.S. Cl. ....................... 349/114; 349/113
(58) Field of Classification Search .................. 349/113, 349/114
See application file for complete search history.

(56) References Cited

U.S. PATENT DOCUMENTS

| | | | |
|---|---|---|---|
| 6,765,635 B1 | 7/2004 | Kelly et al. | |
| 7,099,082 B2 * | 8/2006 | Kawanishi et al. | 359/499 |
| 7,209,205 B2 | 4/2007 | Yoshida et al. | |
| 7,557,883 B2 * | 7/2009 | Kawamoto et al. | 349/119 |
| 7,616,281 B2 * | 11/2009 | Okumura | 349/139 |
| 7,663,717 B2 * | 2/2010 | Kubo et al. | 349/119 |
| 7,705,937 B2 * | 4/2010 | Sakamoto et al. | 349/114 |
| 7,738,065 B2 * | 6/2010 | Shutou et al. | 349/119 |
| 2005/0190318 A1 | 9/2005 | Okumura et al. | |
| 2006/0126156 A1 | 6/2006 | Evans et al. | |
| 2007/0002226 A1 * | 1/2007 | Sakamoto et al. | 349/114 |
| 2007/0002227 A1 * | 1/2007 | Kubo et al. | 349/114 |
| 2007/0019138 A1 * | 1/2007 | Kubo et al. | 349/114 |
| 2007/0171336 A1 * | 7/2007 | Kim et al. | 349/102 |
| 2007/0195237 A1 * | 8/2007 | Kubo et al. | 349/114 |
| 2007/0211198 A1 * | 9/2007 | Nagai et al. | 349/114 |
| 2007/0247580 A1 * | 10/2007 | Okumura | 349/139 |
| 2008/0143926 A1 * | 6/2008 | Amimori et al. | 349/75 |
| 2009/0059143 A1 * | 3/2009 | Shutou et al. | 349/119 |
| 2009/0174857 A1 * | 7/2009 | Amimori et al. | 349/158 |

FOREIGN PATENT DOCUMENTS

| | | |
|---|---|---|
| JP | 2003-149636 | 5/2003 |
| JP | 2006-065285 | 3/2006 |
| KR | 1020030030822 | 4/2003 |
| KR | 1020040005041 | 1/2004 |
| KR | 1020040104610 | 12/2004 |
| KR | 1020050034801 | 4/2005 |

(Continued)

OTHER PUBLICATIONS

English Abstract for Publication No.: 1020030030822.
English Abstract for Publication No.: 2003-149636.
English Abstract for Publication No.: 1020040005041, Sep. 11, 2008.

(Continued)

*Primary Examiner* — K. Cyrus Kianni
(74) *Attorney, Agent, or Firm* — F. Chau & Associates, LLC (57) ABSTRACT

A liquid crystal display device includes a liquid crystal panel including a first substrate having a thin film transistor and forming a transmissive region and a reflective region thereon, a second substrate facing the first substrate and a liquid crystal layer interposed between the first and second substrates and being in an electrically controlled birefringence (ECB) mode, a first optical unit attached to an external surface of the first substrate and having a first polarizing layer, and a second optical unit attached to an external surface of the second substrate and having a second polarizing layer and a compensation film interposed between the second substrate and the second polarizing layer, the compensation film having a single $\lambda/2$ film.

11 Claims, 12 Drawing Sheets

FOREIGN PATENT DOCUMENTS

| | | |
|---|---|---|
| KR | 1020060018773 | 3/2006 |
| KR | 1020060030152 | 4/2006 |
| KR | 1020060111268 | 10/2006 |
| KR | 1020060120076 | 11/2006 |
| KR | 1020060135183 | 12/2006 |
| KR | 2007-033813 | 2/2007 |
| KR | 1020070072338 | 7/2007 |

OTHER PUBLICATIONS

English Abstract for Publication No.: 1020040104610.
English Abstract for Publication No.: 1020050034801.
English Abstract for Publication No.: 1020060018773.
English Abstract for Publication No.: 2006-065285.
English Abstract for Publication No.: 1020060030152.

\* cited by examiner

LIQUID CRYSTAL DISPLAY DEVICE

CROSS-REFERENCE TO RELATED APPLICATION

This application claims priority from Korean Patent Application No. 10-2007-0123844, filed on Nov. 30, 2007 in the Korean Intellectual Property Office, the contents of which are herein incorporated by reference in their entirety.

BACKGROUND OF INVENTION

1. Field of Invention

The present invention relates to a liquid crystal display device.

2. Description of the Related Art

Flat panel display devices, such as a liquid crystal display (LCD) device or an organic light emitting device (OLED), have become widely used.

Among them, the liquid crystal display device is incorporated into many small and large electronic devices from mobile phones to TVs.

A color-super twisted nematic (STN) mode liquid crystal display device is widely used for an external window of a folder-type mobile phone, which does not require a high display quality.

The color-STN mode liquid crystal display device is a passive mode device that does not use a thin film transistor. Such a liquid crystal display device requires, however, several sheets of compensation films to improve optical properties even though a liquid crystal panel has lower manufacturing costs. The use of several compensation films raises manufacturing costs of the color-STN mode liquid crystal display panel, but does not guarantee high display quality.

SUMMARY OF THE INVENTION

The foregoing and/or other embodiments of the present invention can be achieved by providing a liquid crystal display device, comprising: a liquid crystal panel including a first substrate having a thin film transistor and forming a transmissive region and a reflective region thereon, a second substrate facing the first substrate and a liquid crystal layer interposed between the first and second substrates and being in an electrically controlled birefringence (ECB) mode, a first optical unit attached to an external surface of the first substrate and having a first polarizing layer, and a second optical unit attached to an external surface of the second substrate and having a second polarizing layer and a compensation film interposed between the second substrate and the second polarizing layer, the compensation film having a single $\lambda/2$ film.

A gap between the first and second substrates in the transmissive region may be approximately twice that between the first and second substrates in the reflective region.

The transmissive region and the reflective region may be arranged upward and downward, and the reflective region is adjacent to the thin film transistor.

The first polarizing layer may substantially contact the external surface of the first substrate.

The first optical unit may further include a first protection layer which substantially contacts an external surface of the first polarizing layer and is treated with an anti-glare, anti-reflection, anti-scratch or hard coating, and the second optical unit may further comprise a second protection layer which substantially contacts an external surface of the second polarizing layer and is treated with an anti-glare, anti-reflection, anti-scratch or hard coating.

A transmissive axis of the first polarizing layer and a director of the liquid crystal layer may form an angle of about 40 degrees to about 50 degrees.

A slow axis of the $\lambda/2$ film and the director of the liquid crystal layer may form an angle of about 80 degrees to about 110 degrees.

The transmissive axis of the first polarizing layer and a transmissive axis of the second polarizing layer may form an angle of about 85 degrees to about 95 degrees.

The $\lambda/2$ film may have a phase difference of about 240 nm to about 300 nm with respect to light having about a 550 nm wavelength.

The phase difference of the liquid crystal layer may range from about 240 nm to about 300 nm in the transmissive region, and may range from about 110 nm to about 160 nm in the reflective region with respect to light having about a 550 nm wavelength.

The first substrate may include data wires having a data line and a reflective metal layer defining the reflective region.

The second optical unit may further include a diffusion adhesive layer interposed between the $\lambda/2$ film and the second polarizing layer.

The foregoing and/or other embodiments of the present invention can be achieved by providing a liquid crystal display device, including: a liquid crystal panel including a first substrate having a thin film transistor and forming a transmissive region and a reflective region thereon, a second substrate facing the first substrate and a liquid crystal layer interposed between the first and second substrates and being in an electrically controlled birefringence (ECB) mode, a first optical unit attached to an external surface of the first substrate and having a first polarizing layer, and a second optical unit attached to an external surface of the second substrate and having a second polarizing layer and a $\lambda/2$ film interposed between the second substrate and the second polarizing layer, the first polarizing layer substantially contacting the external surface of the first substrate, a first side of the $\lambda/2$ film substantially contacting the second substrate, and a second side of the $\lambda/2$ film substantially contacting the second polarizing layer.

A gap between the first and second substrates in the transmissive region may be approximately twice that between the first and second substrates in the reflective region.

The transmissive region and the reflective region may be arranged upward and downward, and the reflective region is adjacent to the thin film transistor.

A transmissive axis of the first polarizing layer and a director of the liquid crystal layer may form an angle of about 40 degrees to about 50 degrees, a slow axis of the $\lambda/2$ film and the director of the liquid crystal layer may form an angle of about 80 degrees to about 110 degrees, and the transmissive axis of the first polarizing layer and a transmissive axis of the second polarizing layer may form an angle of about 85 degrees to about 95 degrees.

The $\lambda/2$ film may have a phase difference of about 240 nm to about 300 nm with respect to light having about a 550 nm wavelength, and the phase difference of the liquid crystal layer ranges from about 240 nm to about 300 nm in the transmissive region, and ranges from about 110 nm to about 160 nm in the reflective region with respect to light having about a 550 nm wavelength.

The first substrate may include data wires having a data line and a reflective metal layer defining the reflective region.

The first optical unit may further include a first protection layer which substantially contacts an external surface of the first polarizing layer, and the second optical unit may further include a second protection layer which substantially contacts an external surface of the second polarizing layer.

The first and second protection layers may be treated with an anti-glare, anti-reflection, anti-scratch or hard coating.

BRIEF DESCRIPTION OF THE DRAWINGS

The above and/or other embodiments of the present invention will become apparent and more readily appreciated from the following description of exemplary embodiments, taken in conjunction with the accompanying drawings.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to like elements throughout. The embodiments are described below by reference to the figures.

Hereinafter, a liquid crystal display device 1 according to an exemplary embodiment of the present invention will be described with reference to FIGS. 1 to 9.

Figure 2:
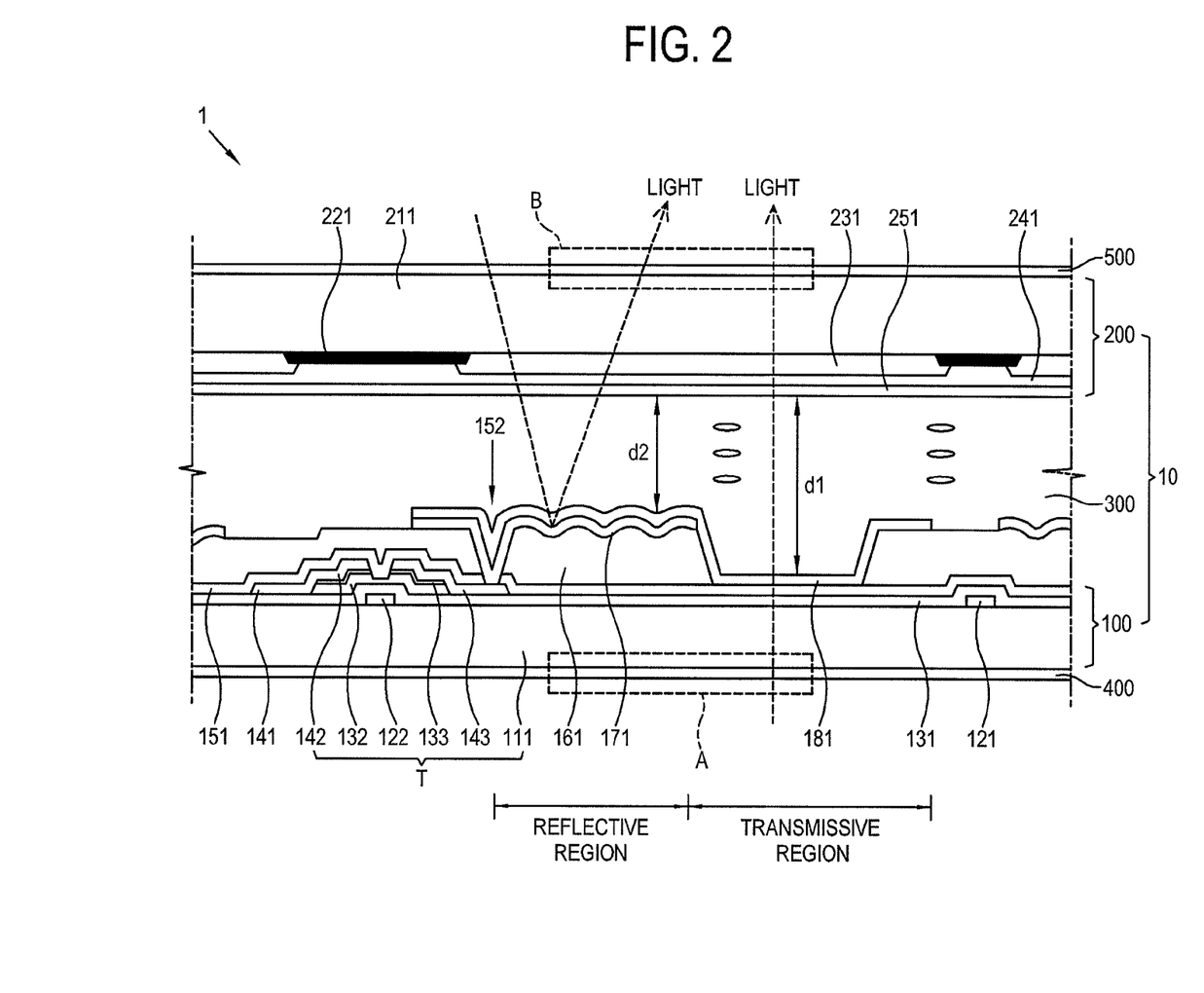
FIG. 2 is a sectional view taken along line II-II in FIG. 1.

As shown in FIG. 2, the liquid crystal display device 1 includes a liquid crystal display panel 10, a first optical unit 400 and a second optical unit 500. The liquid crystal display device 1 may further include a backlight unit (not shown) which is disposed below the first optical unit 400.

The liquid crystal display panel 10 includes a first substrate 100 having a plurality of thin film transistors T, a second substrate 200 facing the first substrate 100, and a liquid crystal layer 300 interposed between the first and second substrates 100 and 200.

The first optical unit 400 is attached to an external surface of the first substrate 100 while the second optical unit 500 is attached to an external surface of the second substrate 200.

Figure 1:
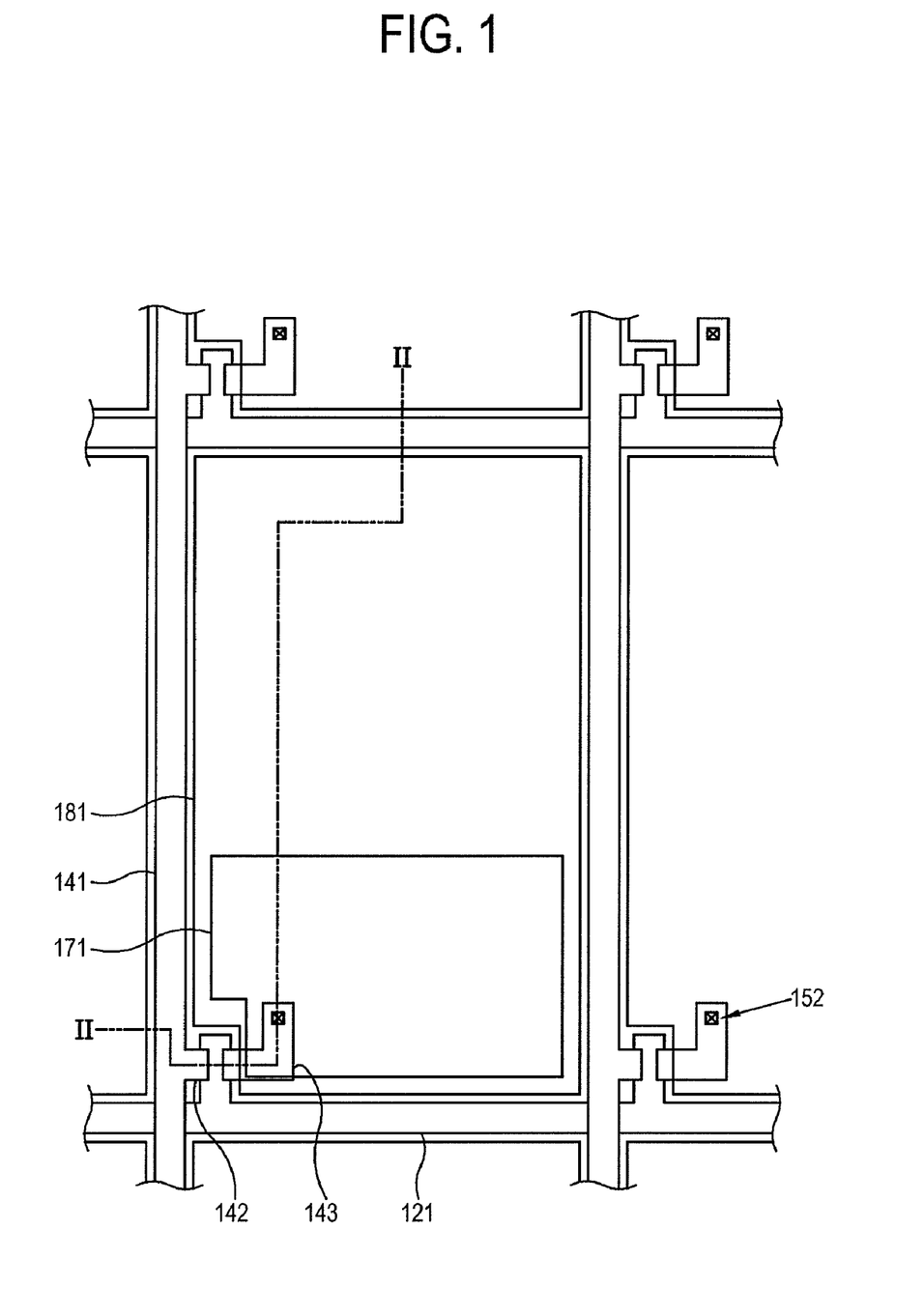
FIG. 1 is a layout view of a liquid crystal display device according to an exemplary embodiment of the present invention.

First, the first substrate 100 will be described with reference to FIGS. 1 and 2.

Gate wires 121 and 122 are formed on a first insulating substrate 111. The gate wires 121 and 122 include a plurality of gate lines 121 which extend in a transverse direction and a plurality of gate electrodes 122 which are connected to the gate lines 121. The gate wires 121 and 122 may further include a plurality of storage capacity lines (not shown) to form storage capacity.

A gate insulating layer 131 including silicon nitride (SiNx) covers the gate wires 121 and 122 on the first insulating substrate 111.

A semiconductor layer 132 including a semiconductor such as amorphous silicon is formed on the gate insulating layer 131 of the gate electrodes 122. An ohmic contact layer 133 including hydrogenated amorphous silicon highly doped with an n-type dopant is formed on the semiconductor layer 132. The ohmic contact layer 133 is removed from channels between source electrodes 142 and drain electrodes 143.

Data wires 141, 142 and 143 are formed on the ohmic contact layer 133 and the gate insulating layer 131. The data wires 141, 142 and 143 include a plurality of data lines 141 vertically intersecting the gate lines 121 to define pixels, the plurality of source electrodes 142 branched from the data lines 141 and extending to an upper part of the ohmic contact layer 133 and the plurality of drain electrode 143 separated from the source electrodes 142 and formed on the ohmic contact layer 133 opposite to the source electrodes 142.

A passivation layer 151 is formed on the data wires 141, 142 and 143 and the semiconductor layer 132 not covered by the data wires 141, 142 and 143. The passivation layer 151 includes silicon nitride (SiNx) and has a plurality of contact holes 152 to expose the drain electrodes 143 therethrough. The contact holes 152 are also formed on an organic layer 161.

The organic layer 161 is formed on the passivation layer 151. The organic layer 161 may be formed by coating, exposing and developing a photoresist material. The organic layer 161 can be thicker than the gate insulating layer 131 and the passivation layer 151.

Parts of the organic layer 161 are removed from transmissive regions in which light from a backlight unit passes through. A surface of the organic layer 161 is shaped like a lens in reflective regions in which external light is reflected. The lens may be shaped like a hemisphere.

A reflective metal layer 171 is formed on the organic layer 161 in the reflective region. The reflective metal layer 171 may include a highly reflective metal such as aluminum, silver or an aluminum-molybdenum alloy. The reflective metal layer 171 is also shaped like a lens having an uneven part since it is formed on the lens-shaped organic layer 161.

The reflective metal layer 171 is disposed in lower parts of pixels and covers the drain electrodes 143. Thus, a reflective region in each pixel is provided in a lower part of the pixel adjacent to the thin film transistor T. The reflective metal layer 171 directly contacts the drain electrodes 143 through the contact holes 152.

A plurality of pixel electrodes 181 are formed on the organic layer 161 and the reflective metal layer 171. The pixel electrodes 181 typically include a transparent conductive material such as indium tin oxide (ITO) or indium zinc oxide (IZO). Each pixel electrode 181 is electrically connected with the drain electrode 143 through the reflective metal layer 171.

According to another exemplary embodiment, the pixel electrodes 181 may be disposed below the reflective metal layer 171 and directly contact the drain electrodes 143.

Referring to FIG. 2, the second substrate 200 and the liquid crystal layer 300 will be described.

A black matrix 221 is formed on a second insulating substrate 211. The black matrix 221 separates the red, green and blue filters and blocks light from being directly emitted to the thin film transistors T formed on the first substrate 100. The black matrix 221 typically includes a photoresist organic material added to a black pigment. The black pigment may include carbon black.

A plurality of color filters 231 include red, green, and blue filters that are repeatedly formed between the black matrixes 221. The color filters 231 filter color from the light emitted from the backlight unit and passing through the liquid crystal layer 300. The color filters 231 typically include a photoresist organic material.

An overcoat layer 241 is formed on the color filters 231 and the black matrixes 221 not covered by the color filters 231. The overcoat layer 241 provides a planar surface and protects the color filters 231. The overcoat layer 241 may include a photoresist acrylic resin.

A common electrode 251 is formed on the overcoat layer 241. The common electrode 251 includes a transparent conductive material such as ITO or IZO. The common electrode 251 forms electric fields together with the pixel electrodes 181 of the first substrate 100 to drive the liquid crystal layer 300.

The liquid crystal layer 300 is in an electrically controlled birefringence (ECB) mode, and alignments of liquid crystal molecules are changed by the electric fields formed by the common electrode 251 and the pixel electrodes 181. A transmittance rate of light passing through the liquid crystal layer 300 is determined by the alignment of the liquid crystal molecules of the liquid crystal layer 300.

In the ECB mode, the liquid crystal layer 300 is horizontally aligned to the first and second substrates 100 and 200. The alignment angle is zero degrees and the liquid crystal layer 300 is aligned anti-parallel to the first and second substrates 100 and 200. If a vertical electric field is applied, liquid crystal molecules of the liquid crystal layer 300 move in two-dimensions with a rapid response speed. If an alignment layer is pre-tilted, a contrast ratio may be lowered.

The first and second substrates 100 and 200 have alignment layers (not shown), respectively, which directly contact the liquid crystal layer 300. The liquid crystal layer 300 has a director in a certain direction by the alignment layers. The director may be determined by a rubbing process. The rubbing may be performed in an opposite direction and in parallel to the first and second substrates 100 and 200, i.e., in anti-parallel to the substrates 100 and 200. A surface of the alignment layer may be partly raised to form a pre-tilt angle.

A thickness d1 of the liquid crystal layer 300 in the transmissive region is thicker than a thickness d2 thereof in the reflective region as the organic layer 161 is removed from the transmissive region. The thickness d1 may be twice the thickness d2. A phase difference $\Delta nd$ of the liquid crystal layer 300, which is represented by a birefringence rate $\Delta n$ and a cell gap d of the liquid crystal layer 300, ranges from about 240 nm to about 300 nm in the transmissive region, and from about 110 nm to about 160 nm in the reflective region with respect to light having about a 550 nm wavelength. Here, the cell gap d refers to a thickness of the liquid crystal layer 300.

Figure 3:
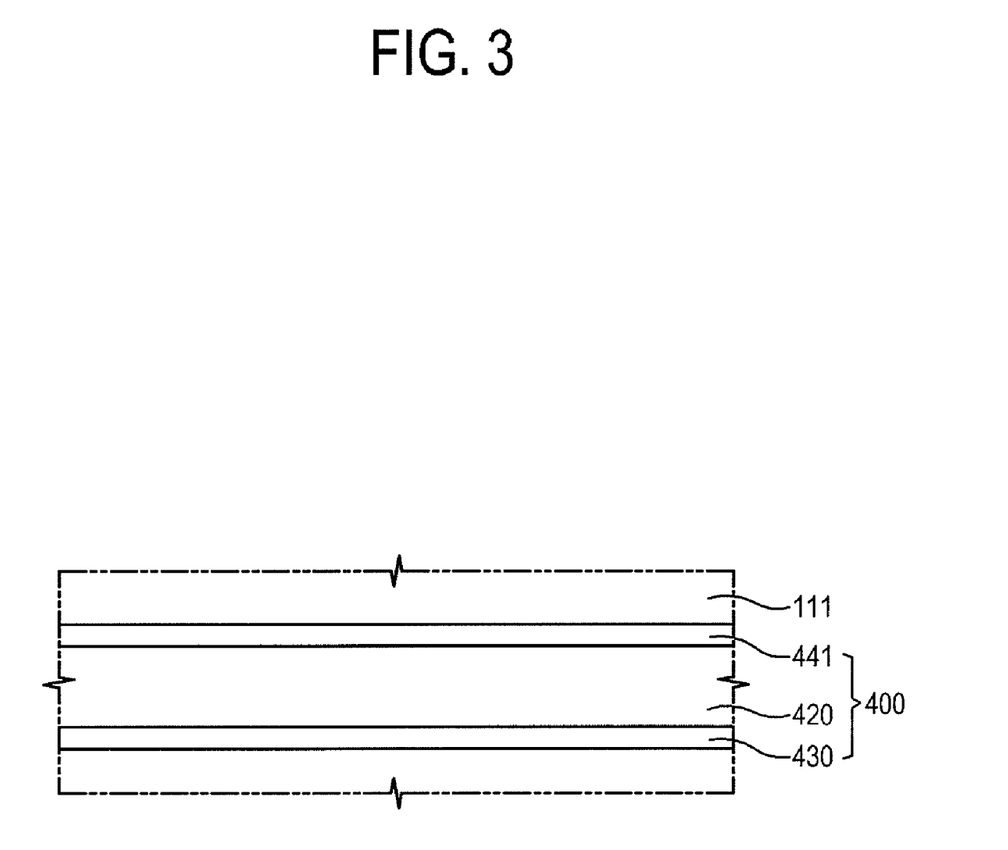
FIG. 3 is an enlarged view of a part A in FIG. 2.

Referring to FIG. 3, the first optical unit 400 will be described.

The first optical unit 400 includes a first polarizing layer 420 and a first protection layer 430, but does not include a compensation film. The first optical unit 400 further includes an adhesive layer 441 to adhere the first polarizing layer 420 and the first insulating layer 111 to each other.

The first polarizing layer 420 may include a first triacetate cellulose film, a polyvinylalcohol film and a second triacetate cellulose film, which are sequentially disposed. The polyvinylalcohol film is a polarizing medium which is stretched in a certain direction, and only light that oscillates in one desired direction passes through the film. The triacetate cellulose film can improve durability, mechanical strength, thermal resistance and humidity resistance of the polarizing medium.

The first protection layer 430 may be treated to be anti-glare, anti-reflection, anti-scratch, or hard coating. The hard coating may have a thickness of several tens of nanometers.

Figure 4:
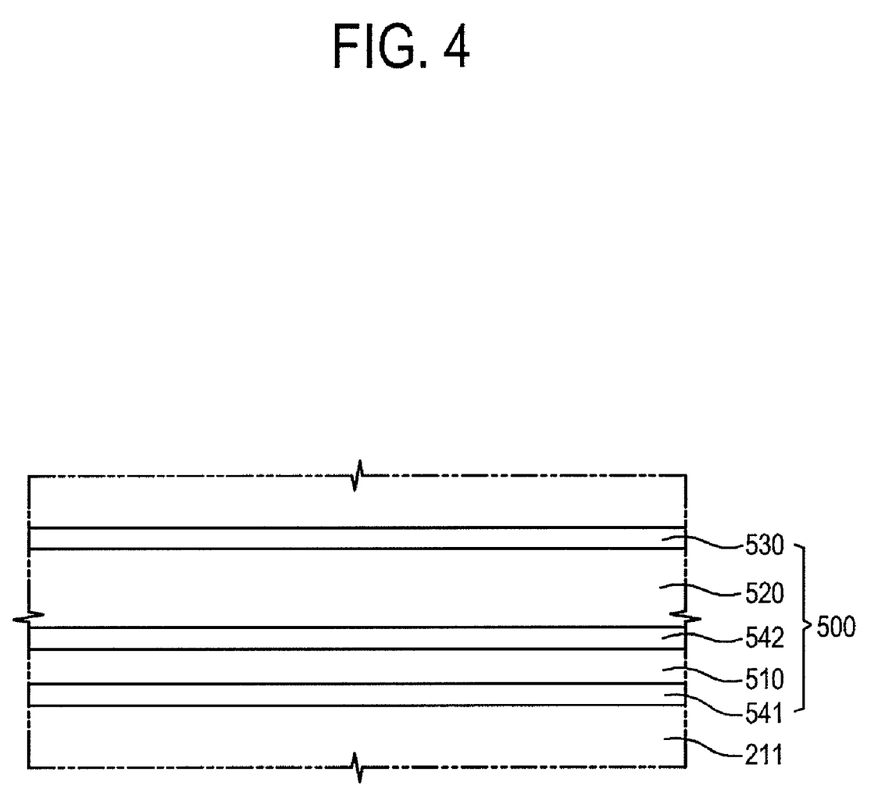
FIG. 4 is an enlarged view of a part B in FIG. 2.

Referring to FIG. 4, the second optical unit 500 will be described.

The second optical unit 500 includes a $\lambda/2$ film 510, a second polarizing layer 520, and a second protection layer 530. The second optical unit 500 further includes an adhesive layer 541 to adhere the $\lambda/2$ film 510 and the second insulating layer 211 to each other, and an adhesive layer 542 to adhere the $\lambda/2$ film 510 and the second polarizing layer 520 to each other. The second optical unit 500 includes only a single $\lambda/2$ film 510 as a compensation film.

The configuration of the second polarizing layer 520 may be the same as that of the first polarizing layer 420.

The second protection layer 530 may be treated to be anti-glare, anti-reflection, anti-scratch, or hard coating.

A phase difference of the $\lambda/2$ film 510 ranges from about 240 nm to about 300 nm with respect to light having about a 550 nm wavelength.

Figure 5:
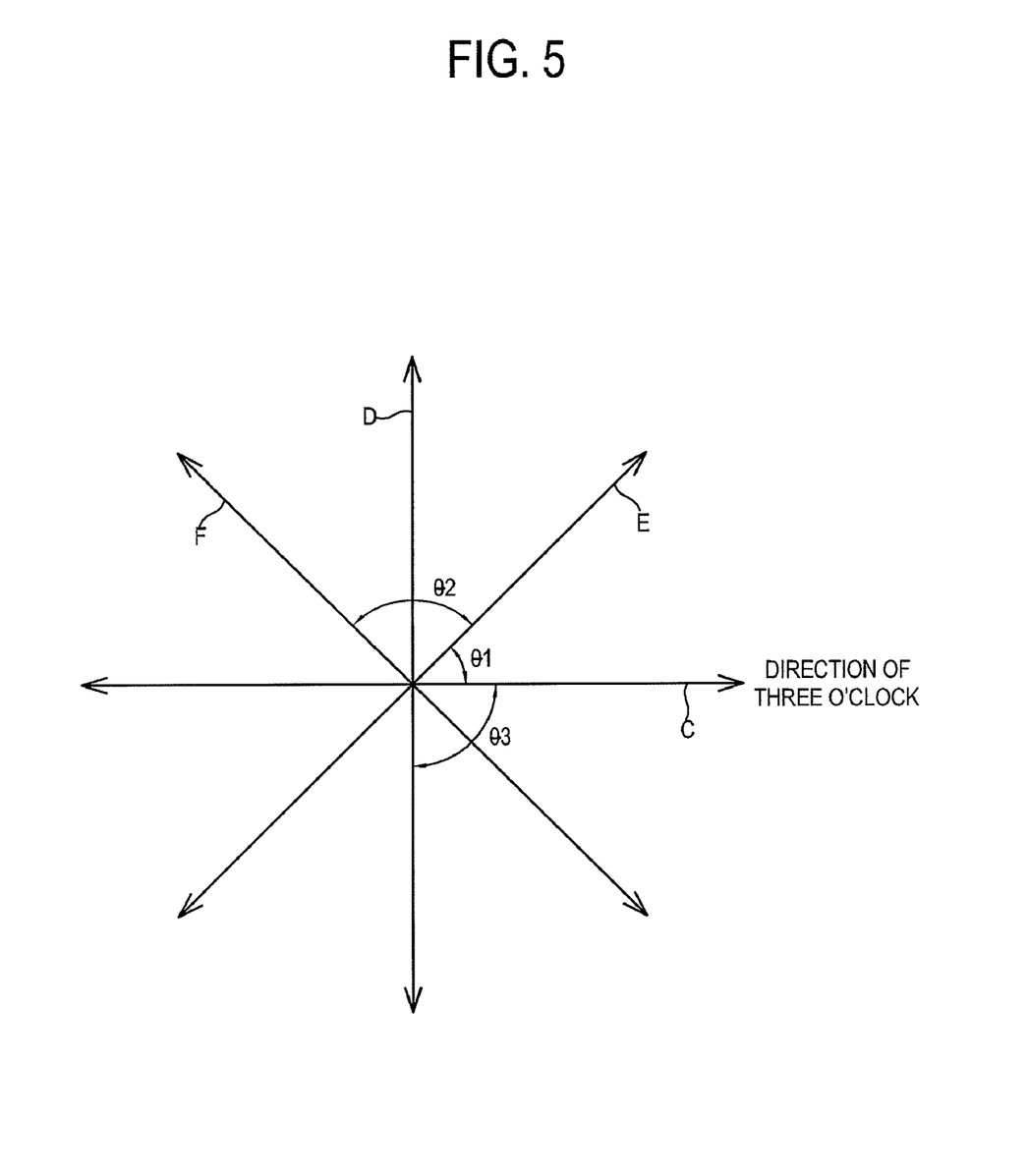
FIG. 5 illustrates the relationship between a transmissive axis of a polarizing layer, a director of a liquid crystal layer and a slow axis of a $\lambda/2$ film in the liquid crystal display device according to an exemplary embodiment of the present invention.

Referring to FIG. 5, the relationship between a transmissive axis of the polarizing layers 420 and 520, the director of the liquid crystal layer 300 and a slow axis of the $\lambda/2$ film 510 will be described.

FIG. 5 illustrates the liquid crystal display device 1 seen from above, and a transmissive axis C of the first polarizing layer 420 is in the direction of three o'clock.

An angle $\theta 1$ formed by the transmissive axis C of the first polarizing layer 420 and the director E of the liquid crystal layer 300 is about 40° to about 50°. An angle $\theta 2$ formed by the slow axis F of the $\lambda/2$ film 510 and the director E of the liquid crystal layer 300 is about 80° to about 110°. An angle $\theta 3$ formed by the transmissive axis C of the first polarizing layer 420 and a transmissive axis D of the second polarizing layer 520 is about 85° to about 95°.

The liquid crystal display panel 10 described above is a transflective type having reflective regions and transmissive regions. A passage of light will be described hereinafter.

Light emitted from the backlight unit and directed to the transmissive region passes through the first optical unit 400, the first substrate 100, the liquid crystal layer 300, the second substrate 200 and the second optical unit 500 to exit to the outside. While passing through the liquid crystal layer 300, transmittance of the light is controlled. The light is filtered by passing through the color filter 231, and its phase difference is compensated by the $\lambda/2$ film 510 and the first and second polarizing layers 420 and 520.

The light emitted from the backlight and directed to the reflective region is reflected back to the backlight unit by the reflective metal layer 171, and is then recycled.

Light which is incident from the outside to the reflective region through the second optical unit 500 and the second substrate 200 is reflected by the reflective metal layer 171, and then emitted to the outside through the second substrate 200 and the second optical unit 500. Transmittance of the light is controlled by the liquid crystal layer 300. The light is filtered by passing through the color filter 230, and its phase difference is compensated by the λ/2 film 510 and the second polarizing layer 520.

FIGS. 6 to 9 illustrate simulation results of optical properties of the liquid crystal display device 1 according to an exemplary embodiment of the present invention. The simulation results were obtained by assuming optimal conditions of the liquid crystal layer 300, the polarizing layers 420 and 520 and the λ/2 film 510, although there may be deviations in the conditions in a real situation.

In the simulation, the phase difference Δnd of the liquid crystal layer 300 is about 285 nm in the transmissive region, and about 142 nm in the reflective region with respect to light having about a 550 nm wavelength. The phase difference of the λ/2 film 510 is set to be about 275 nm with respect to light having about a 550 nm wavelength. An angle θ1 formed by the transmissive axis C of the first polarizing layer 420 and the director E of the liquid crystal layer 300 is set to about 45°, an angle θ2 formed by the slow axis F of the λ/2 film 510 and the director E of the liquid crystal layer 300 is set to about 90°, and an angle θ3 formed by the transmissive axis C of the first polarizing layer 420 and the transmissive axis D of the second polarizing layer 520 is set to about 90°.

Figure 6:
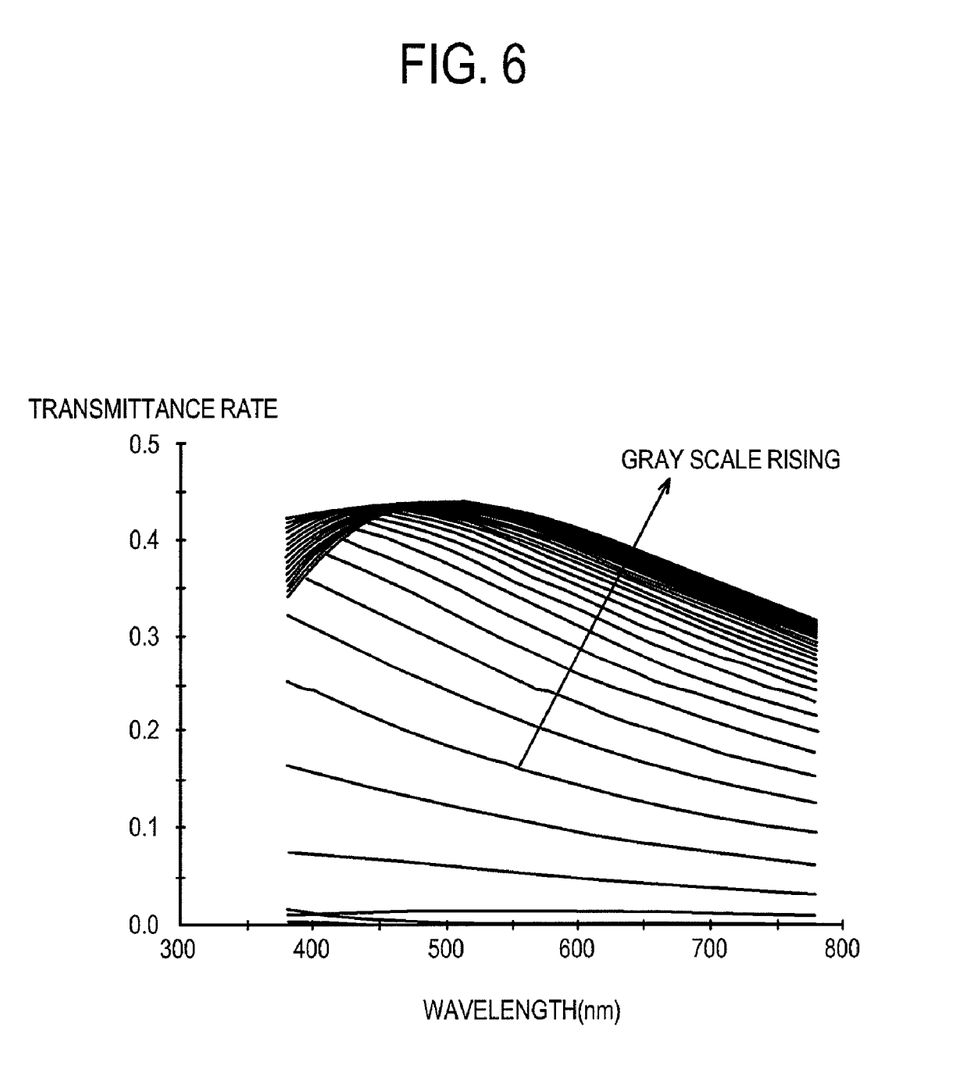
FIG. 6 is a graph to illustrate transmissive properties of gray scales according to wavelengths in the liquid crystal display device according to an exemplary embodiment of the present invention.

FIG. 6 illustrates gray scale properties as a function of wavelength. Although there is a gray inversion at a high gray scale, the gray scale is essentially equivalent to that of a normal twisted nematic (TN) mode, and better than that of a color-STN mode.

Figure 7:
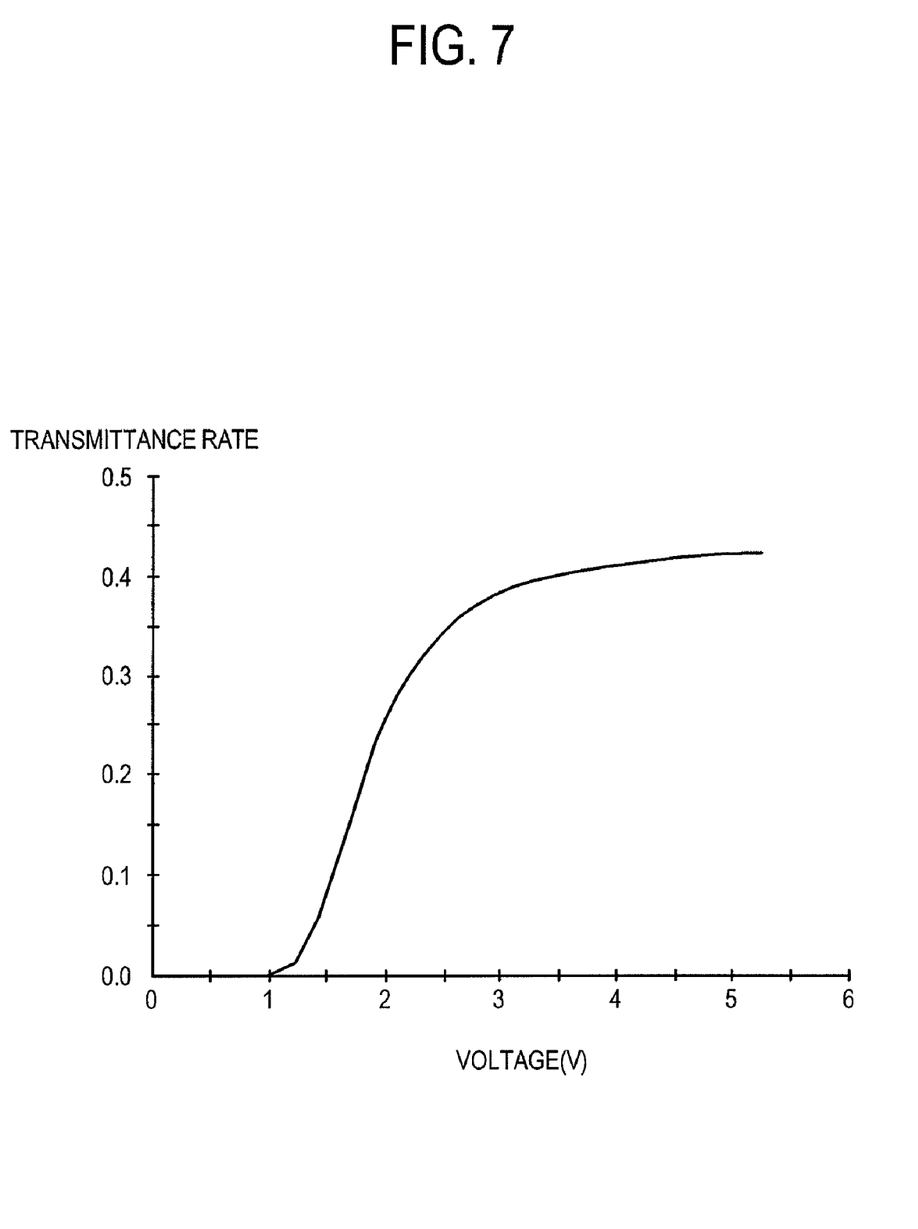
FIG. 7 is a graph to illustrate a transmission rate according to voltages in a transmissive mode of the liquid crystal display device according to an exemplary embodiment of the present invention.

FIG. 7 illustrates a transmittance rate with respect to voltage. If no voltage is applied, a black screen will normally be displayed. At higher voltages, the transmittance rate is about 40% and above, and a contrast ratio is about 3500:1.

Figure 8:
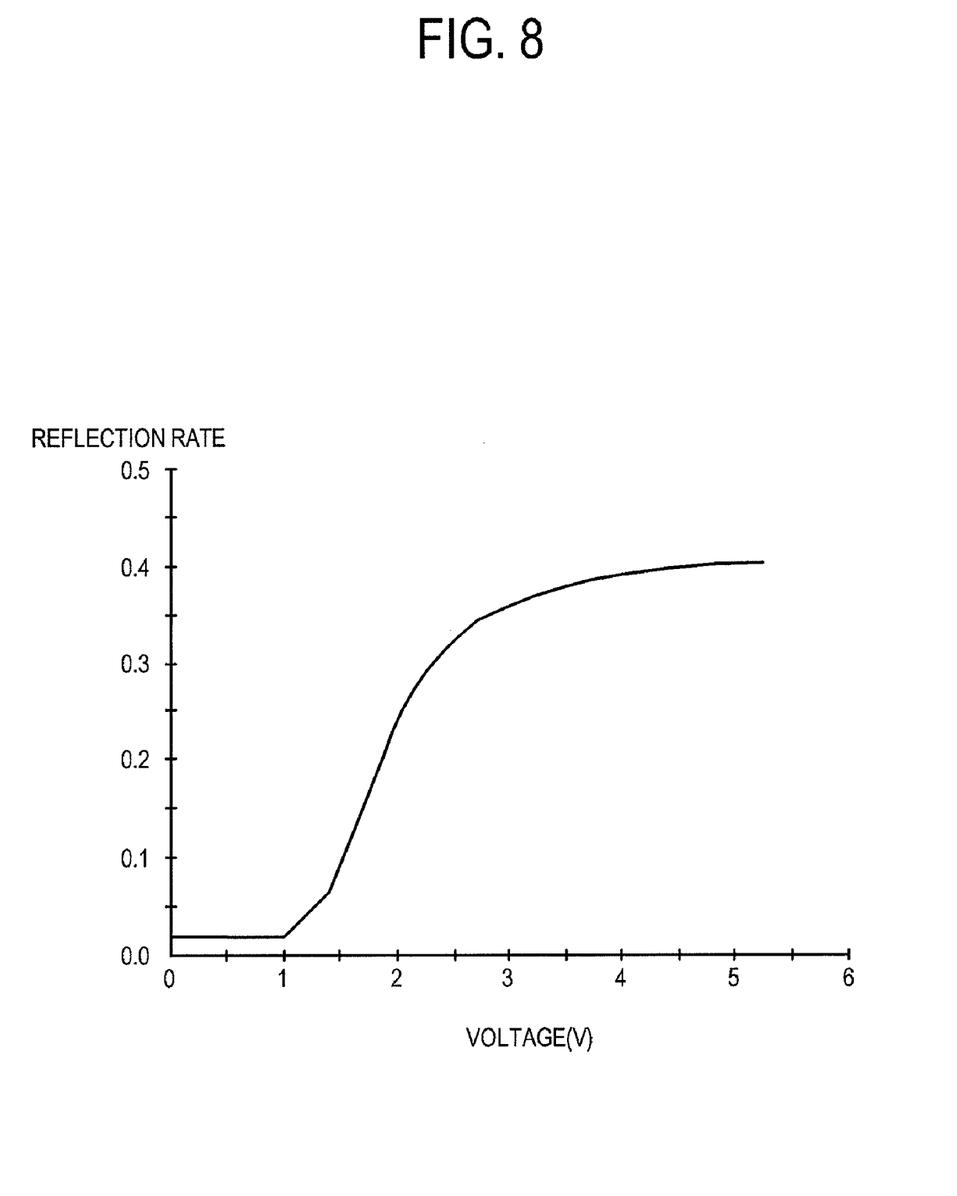
FIG. 8 is a graph to illustrate a reflection rate according to voltages in a reflective mode of the liquid crystal display device according to an exemplary embodiment of the present invention.

FIG. 8 illustrates a reflection rate with respect to voltage. If no voltage is applied, the reflection rate is essentially zero and a black screen will normally be displayed. At higher voltages, the reflection rate is about 40% and above, and a contrast ratio is about 30:1.

When the contrast ratio in the transmissive mode is about 1500:1, a contrast ratio in the reflective mode may be about 100:1.

Figure 9:
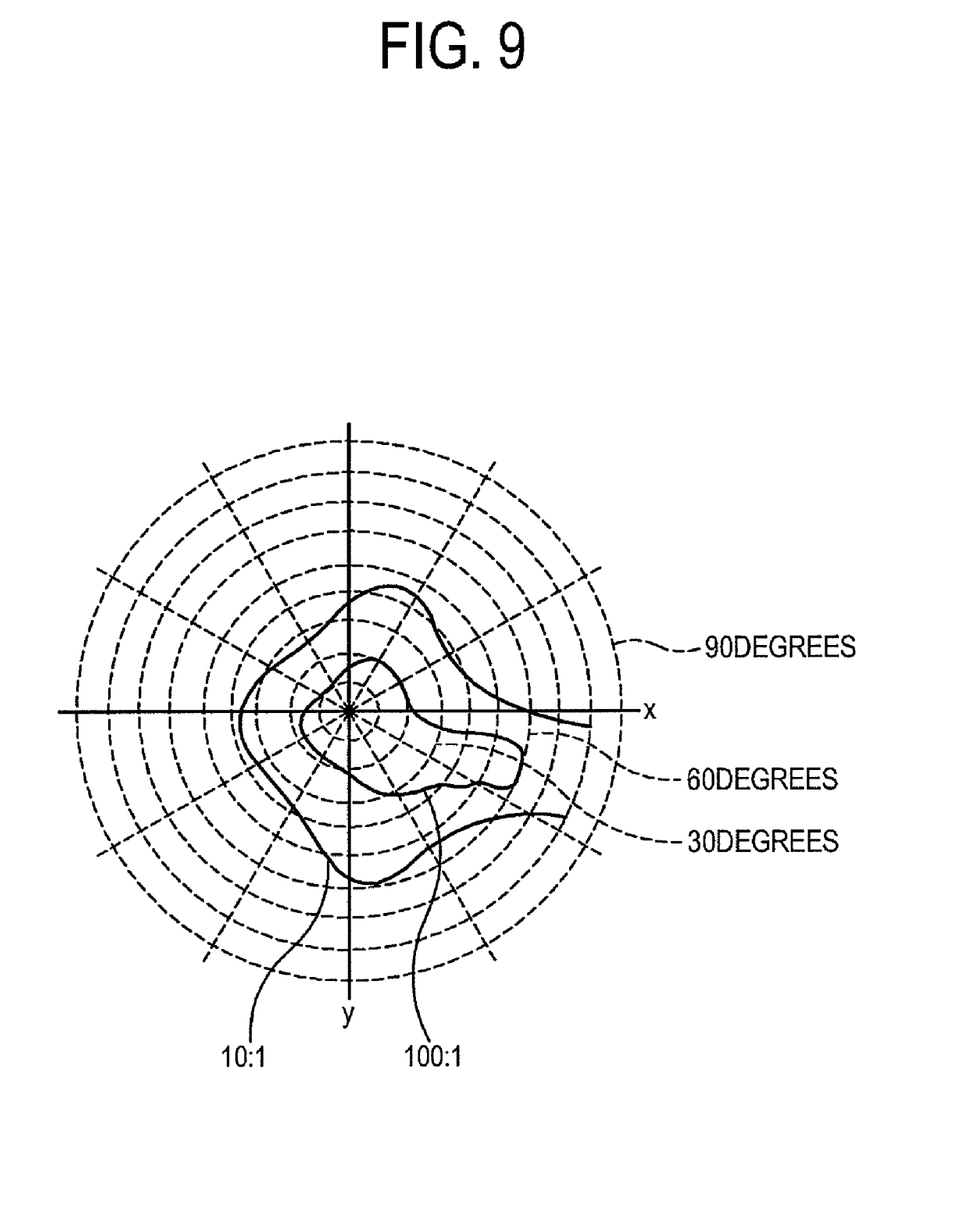
FIG. 9 is a graph to illustrate a property of a viewing angle in the liquid crystal display device according to an exemplary embodiment of the present invention.

FIG. 9 illustrates properties of a viewing angle for contrast ratios of about 10:1 and about 100:1. As a mobile device, such as an external window of a folder type mobile phone, is not generally viewed by more than one person simultaneously, a viewing angle does not matter. Some users even prefer a product having a narrower viewing angle. In case of a contrast ratio of about 10:1, which is the basis of a viewing angle, a viewing angle of about 40 degrees is secured upward, downward, leftward and rightward, according to the simulation results.

The color properties for gray scales according to an embodiment of the present invention are better than those of a color-STN mode.

Table 1 compares a specification of a color-STN mode required by a mobile phone manufacturer for the external window of the folder type mobile phone and a specification of the liquid crystal display device 1 according to an embodiment the present invention. Data in Table 1 for an exemplary embodiment of the present invention were obtained by a survey. According to an exemplary embodiment, an aperture ratio is approximately 28% in the transmissive mode, and approximately 53% in the reflective mode.

TABLE 1

| Item | Specification | Exemplary embodiment |
|---|---|---|
| Transmittance rate | Minimum value: about 1.9% Representative value: about 2.8% | Representative value: about 4% |
| Reflection rate | Minimum about 3.6% | Minimum about 4% |
| Contrast ratio in transmissive mode | Minimum about 12:1 | Minimum about 200:1 |
| Contrast ratio in reflective mode | Minimum about 4.5:1 | Minimum about 6:1 |
| Response rate | Maximum about 222 ms Representative value: about 207 ms | Maximum about 35 ms Representative value: about 30 ms |

The transmittance rate and the reflection rate in Table 1 are determined by considering the aperture ratio of the first substrate 100, light loss in the polarizing layers 420 and 520 and light loss in the color filter 221.

Referring to Table 1, the liquid crystal display device 1 according to an embodiment of the present invention provides a superior response rate to that of a color-STN mode liquid crystal display device used for the external window of a conventional dual display device, while essentially satisfying all specifications.

The liquid crystal display device 1 according to an embodiment of the present invention uses a single λ/2 film 510 as a compensation film. Since the compensation film is expensive, manufacturing costs can rise if several sheets of compensation films are used, such as in the conventional color-STN mode liquid crystal display device. As a liquid crystal display device according to an embodiment of the present invention uses a single λ/2 film 510 as a compensation film, it is price-competitive to a conventional color-STN mode while providing an improved display quality.

Figure 10:
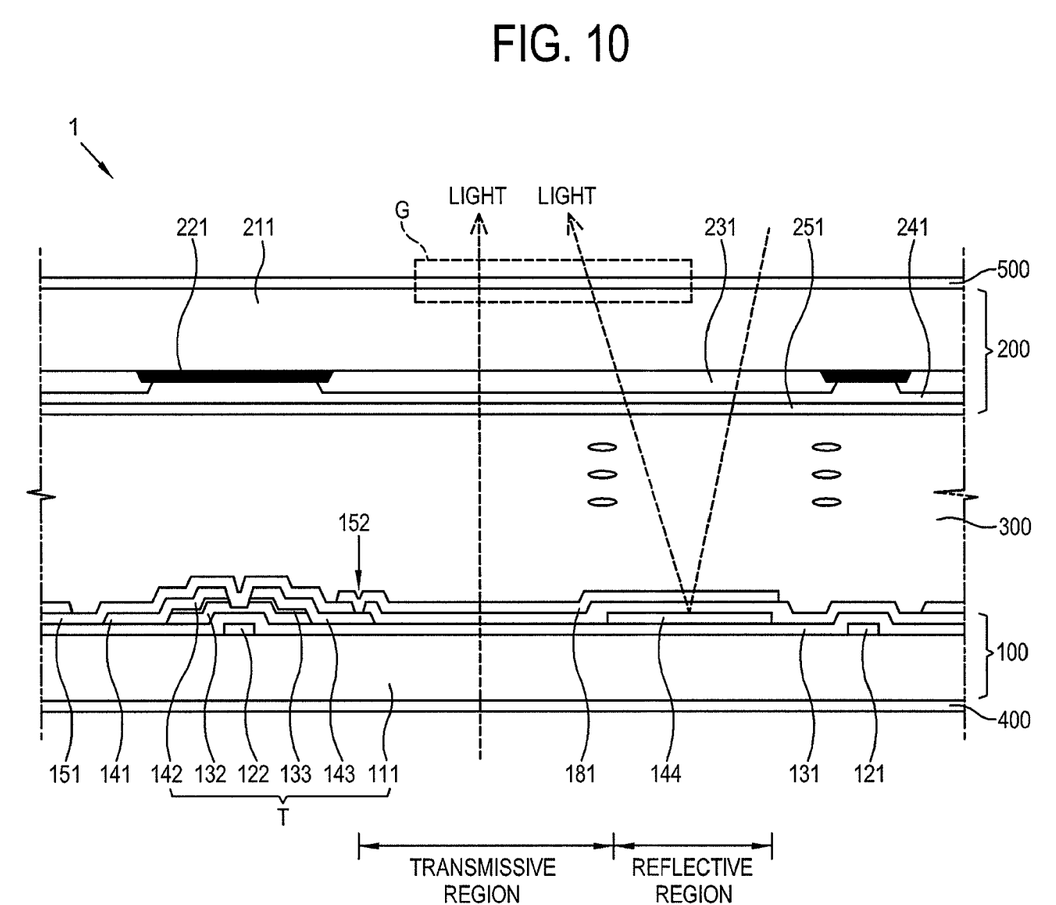
FIG. 10 is a sectional view of a liquid crystal display device according to another exemplary embodiment of the present invention.
Figure 11:
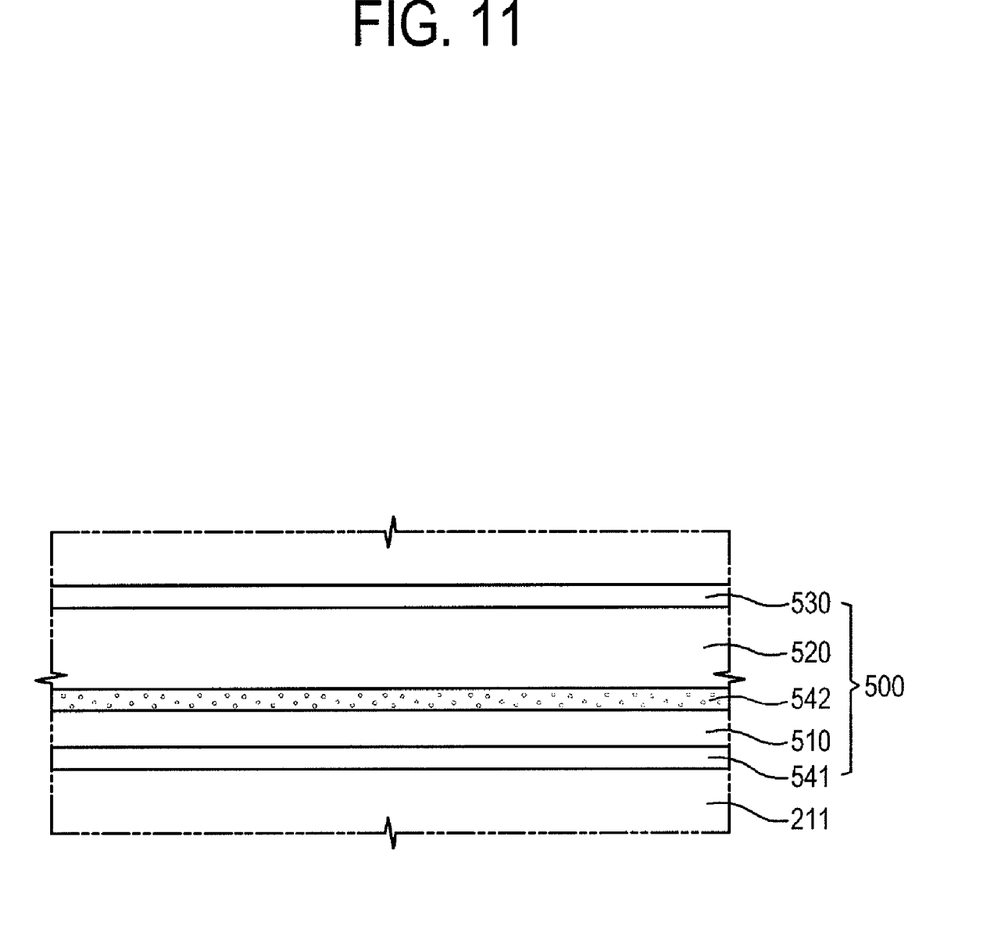
FIG. 11 is an enlarged view of a part G in FIG. 10.

Referring to FIGS. 10 and 11, a liquid crystal display device according to another exemplary embodiment of the present invention will be described, focusing on differences from that according to the embodiment of FIGS. 1 to 9.

In the liquid crystal display device 1a according to an exemplary embodiment, data wires 141, 142, 143, and 144 further include a plurality of data reflective metal layers 144 that are disposed in reflective regions, as compared with the liquid crystal display device 1. An additional reflective metal layer is not provided. The data reflective metal layers 144 reflect incident light. The data reflective metal layers 144 directly contact a first insulating layer 111 and is not lens shaped.

To secure reflective properties of the data reflective metal layers 144, the data wires 141, 142, 143, and 144 may include Al/Cr double layers or Ti/Al/Ti triple layers, but are not limited thereto. Alternatively, the data wires 141, 142, 143, and 144 may include single or multiple layers having good reflective properties.

According to a present embodiment, transmissive regions are formed in lower parts of pixels adjacent to thin film transistors T. According to another exemplary embodiment, the reflective regions may be formed in lower parts of the pixels adjacent to the thin film transistors T as in an embodiment according to FIGS. 1 to 9.

Referring now to FIG. 11, an adhesive layer 542a of a second optical unit 501 includes a diffusion adhesive layer. That is, diffusion particles are scattered in the adhesive layer 542a and diffuse incident light. The adhesive layer 542a acts as an organic layer 161 in an embodiment according to FIGS.

1 to 9, and according to another embodiment, the organic layer is not formed in the first substrate 101.

In the liquid crystal display device 1a according to an embodiment of the present invention, manufacturing costs of the first substrate 101 can be reduced. That is, a process of forming the organic layer 161 and a process of forming the reflective metal layer 171 performed in an embodiment according to FIGS. 1 to 9 are omitted an embodiment according to FIGS. 10 and 11. Manufacturing costs of the liquid crystal display device 1a can be further reduced, and price-competitiveness to the conventional color-STN mode can be enhanced.

Figure 12:
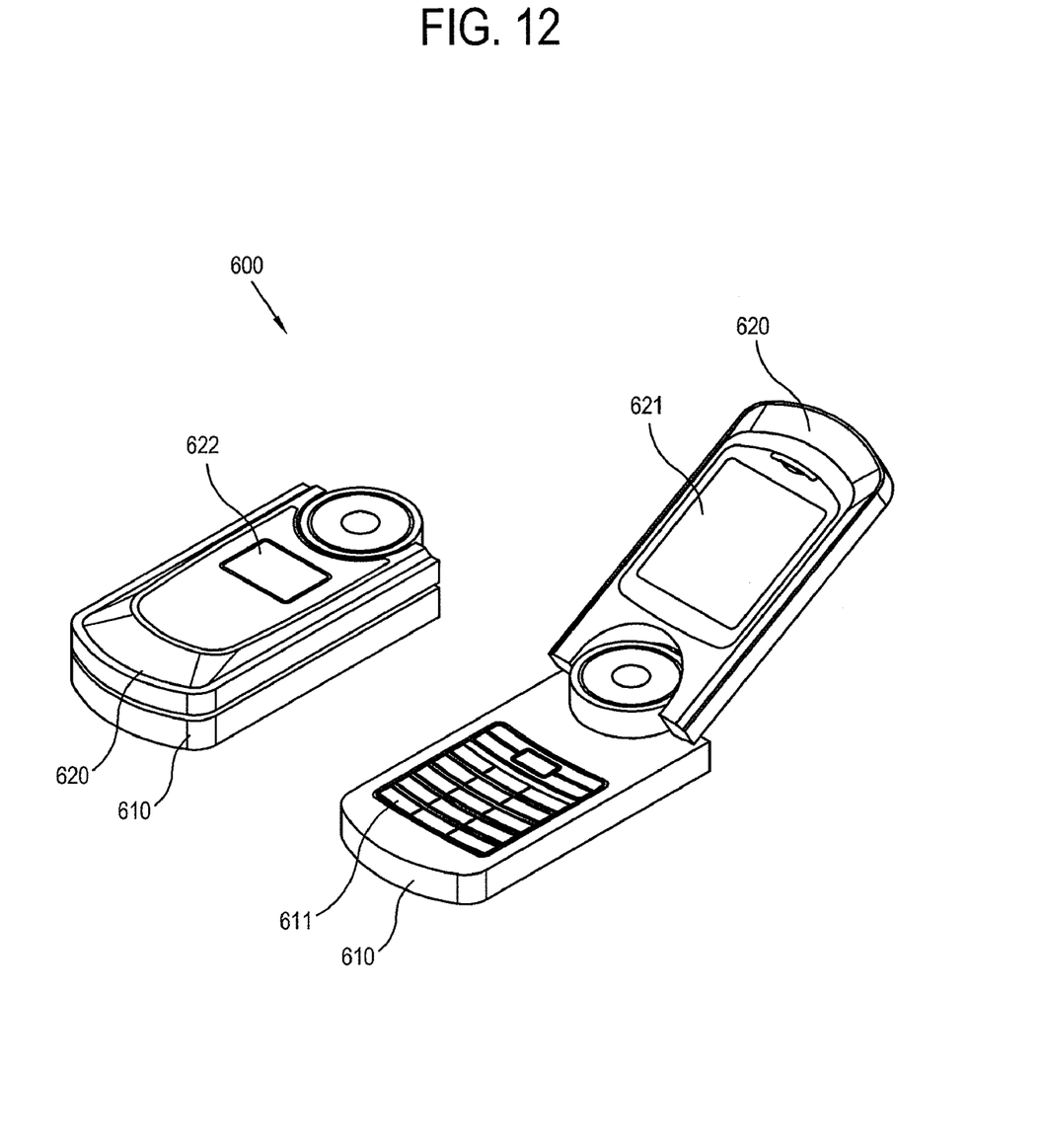
FIG. 12 illustrates an electronic device that employs a liquid crystal display device according to an embodiment of the present invention.

FIG. 12 is a perspective view of an electronic device 600 which includes the liquid crystal display device 1 or 1a according to an embodiment of the present invention.

As shown therein, an electronic device 600 is a folder type mobile phone. The electronic device 600 includes a main body 610 having a key pad 611 and a display unit 620 rotatably connected to the main body 610 and displaying a screen.

The display unit 620 includes an internal window 621 that displays a relatively large screen when the electronic device 600 is unfolded, and an external window 622 which displays a relatively small screen when the electronic device 600 is folded.

The liquid crystal display device 1 or 1a according to an embodiment of the present invention may be used as the external window 622 of the display unit 620. The liquid crystal display device 1 or 1a according to an embodiment of the present invention has lower manufacturing costs and thus can reduce manufacturing costs of the electronic device 600 while providing good display quality.

The liquid crystal display device 1 or 1a according to an embodiment of the present invention may also be used in a display unit of a portable device such as a display window of an MP3 player as well.

As described above, embodiments of the present invention provide a liquid crystal display device that reduces manufacturing costs and provides good display quality.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display device, comprising:
   a liquid crystal panel comprising a first substrate having a thin film transistor and forming a transmissive region and a reflective region thereon, a second substrate facing the first substrate and a liquid crystal layer interposed between the first and second substrates and being in an electrically controlled birefringence (ECB) mode;
   a first optical unit attached to an external surface of the first substrate and having a first polarizing layer; and
   a second optical unit attached to an external surface of the second substrate and having a second polarizing layer; and
   a single $\lambda/2$ compensation film interposed between the second substrate and the second polarizing layer,
   wherein a transmissive axis of the first polarizing layer and a director of the liquid crystal layer form an angle of 40 degrees to 50 degrees wherein at least one black matrix layer is formed between the second optical layer and the liquid crystal layer.

2. The liquid crystal display device of claim 1, wherein a gap between the first and second substrates in the transmissive region is approximately twice that between the first and second substrates in the reflective region.

3. The liquid crystal display device of claim 1, wherein the transmissive region and the reflective region are arranged upward and downward, and the reflective region is adjacent to the thin film transistor.

4. The liquid crystal display device of claim 1, wherein the first polarizing layer substantially contacts the external surface of the first substrate.

5. The liquid crystal display device of claim 4, wherein the first optical unit further comprises a first protection layer which substantially contacts an external surface of the first polarizing layer and is treated with an anti-glare, anti-reflection, anti-scratch, or hard coating, and
   the second optical unit further comprises a second protection layer which substantially contacts an external surface of the second polarizing layer and is treated with an anti-glare, anti-reflection, anti-scratch, or hard coating.

6. The liquid crystal display device of claim 1, wherein a slow axis of the $\lambda/2$ film and the director of the liquid crystal layer form an angle of 80 degrees to 110 degrees.

7. The liquid crystal display device of claim 1, wherein the transmissive axis of the first polarizing layer and a transmissive axis of the second polarizing layer form an angle of 85 degrees to 95 degrees.

8. The liquid crystal display device of claim 1, wherein the $\lambda/2$ film has a phase difference of 240 nm to 300 nm with respect to light having a 550 nm wavelength.

9. The liquid crystal display device of claim 1, wherein the phase difference of the liquid crystal layer ranges from 240 nm to 300 nm in the transmissive region, and ranges from 110 nm to 160 nm in the reflective region with respect to light having a 550 nm wavelength.

10. The liquid crystal display device of claim 1, wherein the first substrate comprises data wires having a data line and a reflective metal layer defining the reflective region.

11. The liquid crystal display device of claim 10, wherein the second optical unit further comprises a diffusion adhesive layer which is interposed between the $\lambda/2$ film and the second polarizing layer.

* * * * *